Aug. 6, 1940.    H. E. STOKES    2,210,692
VENTILATION OF DYNAMOELECTRIC MACHINES
Filed May 26, 1938

WITNESSES:
C. J. Weller.
F. P. Lyle

INVENTOR
Harold E. Stokes.
BY O. B. Buchanan
ATTORNEY

Patented Aug. 6, 1940

2,210,692

UNITED STATES PATENT OFFICE 2,210,692

VENTILATION OF DYNAMOELECTRIC MACHINES

Harold E. Stokes, Murraysville, Pa., assignor to Westinghouse Electric & Manufacturing Company, East Pittsburgh, Pa., a corporation of Pennsylvania Application May 26, 1938, Serial No. 210,181

6 Claims. (Cl. 171—252)

The present invention relates to the ventilation of dynamoelectric machines, and, more particularly, to improved means for the ventilation of double-armature machines of relatively large size.

In the past, the usual method of ventilating dynamoelectric machines has been to pass cool air through the machines, either directly from the room in which the machines are located, or from ducts, and to discharge the heated air from the machines back into the room. In large motor rooms, however, such as are found in modern steel mills, for example, in which motors or generators aggregating many thousands of horsepower may be installed, this method of ventilation results in excessively high temperatures in the motor room. This gives very undesirable working conditions and impairs the effectiveness of the ventilation.

The more modern practice, therefore, is to pass cool air from the room through the machines and discharge the heated air outside of the motor room where it is cooled and cleaned. The cool air is then blown back into the motor room where it is maintained at a pressure slightly above atmospheric so that it will readily flow into and through the machines.

The object of the present invention is to provide a double-armature dynamoelectric machine which is adapted for ventilation in accordance with the method outlined above.

A further object is to provide a ventilating system for a double-armature dynamoelectric machine in which the cooling air is taken from the room in which the machine is located and the heated air is discharged outside of the room.

Figure 1:
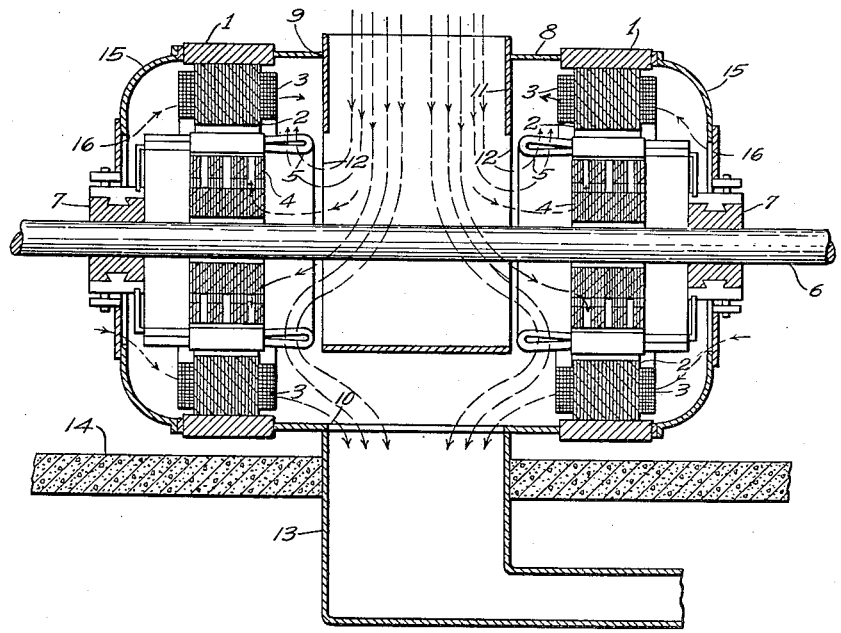
Figure 2:
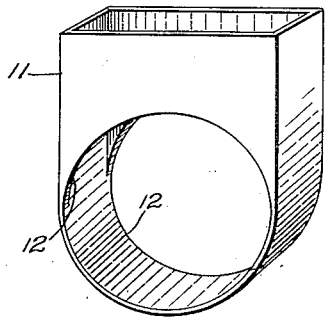

The invention will be more fully understood from the accompanying drawing, in which:

Figure 1 is a longitudinal section through a double-armature dynamoelectric machine; and, Fig. 2 is a perspective view of an air inlet duct.

The invention is shown in the drawing as applied to a double-armature direct current machine, which may be either a motor or a generator. As shown in Fig. 1, this machine comprises two units, each of which has a stator frame 1 on which are mounted a plurality of pole pieces 2 carrying field windings 3. The armature or rotor member 4 of each unit consists of a laminated core having radial and axial air ducts and carrying suitable windings 5 placed in slots about its periphery. The armatures of both units are keyed, or otherwise secured to a common shaft 6 which is supported for rotation in suitable external bearings, not shown. A commutator 7 for each unit is also keyed to or otherwise mounted on the shaft.

To provide for ventilation of the machine, the space between the two units is completely enclosed by a cylindrical cover 8 of sheet steel or other suitable material which is secured to the inner sides of the stator frames 1. This cover may, if desired, be made in two semi-cylindrical halves or other convenient subdivision and bolted together for ease in assembly. Two large openings 9 and 10 are formed in this cover and are preferably, although not necessarily, located diametrically opposite to each other at the top and bottom of the machine. An air inlet duct 11 is secured in the opening 9 and extends through the opening into the interior of the space enclosed by the cover 8. As shown more clearly in Fig. 2, this duct 11 is rectangular in cross-section and is closed at its lower end. Large circular openings 12 are provided on each side of the duct and these openings are approximately of the same diameter as the armatures 4. It will be seen from Fig. 1 that the duct is placed in the cover so that the openings 12 are concentric with the shaft 6 and that the dimensions of the duct are such that the openings are closely adjacent the armatures. An external air duct 13 is connected to the opening 10 and passes out of the room through the floor 14 or at some other convenient point to conduct away the heated air discharged from the machine.

End bells 15 are secured to the outer sides of the stator members 1. These end bells have central openings of slightly greater diameter than the armatures in order to permit the entrance of sufficient air to cool the field coils. Suitable brush rigging 16 is supported from these end bells.

In operation, as explained above, the air in the motor room is maintained at a pressure slightly above atmospheric and will therefore flow through the duct 11 and the openings of the end bells 15 into the machine. The major portion of the air necessary to cool the machine enters through the duct 11 and the openings 12 and passes through the radial ducts in the armature cores 4 and also over and around the windings 5 as shown by the arrows in Fig. 1. A certain amount of air will also flow into the machine through the end bells 15 past the brush rigging 16 and pass over the windings on the stator member to cool them. The openings in the end bells are so proportioned that only enough air will flow through them to provide the necessary ventilation for the field windings. The heated air flows to the lower part of the machine and escapes through the duct 13 from which it is discharged outside of the motor room. If desired the heated air may be passed through cooling and cleaning equipment and blown back into the motor room.

It will be seen, therefore, that a relatively simple construction has been provided which furnishes very effective cooling for the machine and which makes it possible to discharge the heated air outside of the motor room, thus avoiding undesirably high temperatures in the room. It is to be understood that, while the invention has been shown as applied to a direct current machine for the purpose of illustration, it is not limited to such machines but may equally well be applied to alternating current machines of any type.

Although a specific embodiment of the invention has been shown and described, it is to be understood that the invention is not limited to the particular details of construction shown, but, in its broadest aspect, it includes all equivalent embodiments and modifications which come within the scope of the appended claims.

I claim as my invention:

1. A dynamoelectric machine comprising two aligned stator members, a shaft, two rotor members on the shaft cooperating respectively with the stator members, a cover between the stator members and secured to them, said cover completely enclosing the space between the stator members and having two openings therein, an air inlet duct extending through one of said openings, said duct being closed at its end and having openings in its sides opposite the rotor members, and of approximately the same diameter as the rotor members, and an external air outlet duct connected to the other opening.

2. A dynamoelectric machine comprising two aligned stator members, a shaft, two rotor members on the shaft cooperating respectively with the stator members, a cover between the stator members and secured to them, said cover completely enclosing the space between the stator members and having two openings therein, an air inlet duct extending through one of said openings into the interior of the cover, said duct being closed at its end and having openings on each side concentric with the shaft and of approximately the same diameter as the rotor members, and an external air outlet duct connected to the other opening in the cover.

3. A ventilating system for a dynamoelectric machine having two stator members, a shaft and two rotor members mounted on the shaft and cooperating respectively with the stator members comprising means for enclosing the space between the stator members, an air duct extending into said space, said duct being open at its outer end for the entrance of air from a room in which the machine is located and closed at its inner end and having openings within said space opposite the rotor members and of approximately the same diameter as the rotor members, and a second air duct communicating with said space for the discharge of heated air therefrom and extending outside the room.

4. A ventilating system for a dynamoelectric machine having two stator members, a shaft and two rotor members mounted on the shaft and cooperating respectively with the stator members comprising means for enclosing the space between the stator members, an air duct extending into said space, said duct being open at its outer end for the entrance of air from a room in which the machine is located and closed at its inner end and having openings within said space opposite the rotor members and of approximately the same diameter as the rotor members, a second air duct communicating with said space for the discharge of heated air therefrom and extending outside the room, and end bells enclosing the outer sides of the stator members and having central openings to permit the entrance of air for cooling the stator windings.

5. A dynamoelectric machine comprising two aligned stator members, a shaft, two rotor members on the shaft cooperating respectively with the stator members, a cover between the stator members and secured to them, said cover completely enclosing the space between the stator members and having two openings therein, an air inlet duct extending through one of said openings, said duct being closed at its end and having openings in its sides opposite the rotor members, and of approximately the same diameter as the rotor members, an external air outlet duct connected to the other opening, and end bells on the outer sides of the stator members, said end bells having central openings of greater diameter than the rotor members.

6. A dynamoelectric machine comprising two aligned stator members, a shaft, two rotor members on the shaft cooperating respectively with the stator members, a cover between the stator members and secured to them, said cover completely enclosing the space between the stator members and having two openings therein, an air inlet duct extending through one of said openings into the interior of the cover, said duct being closed at its end and having openings on each side concentric with the shaft and of approximately the same diameter as the rotor members, an external air outlet duct connected to the other opening in the cover, and end bells on the outer sides of the stator members, said end bells having central openings of great enough diameter to permit the entrance of air for cooling the stator windings.

HAROLD E. STOKES.